US012596177B2

(12) United States Patent
Yamamoto

(10) Patent No.: US 12,596,177 B2
(45) Date of Patent: Apr. 7, 2026

(54) LIDAR DEVICE WITH HEATER WIRE FOR HEATING OPTICAL WINDOW OF HOUSING

(71) Applicant: DENSO CORPORATION, Kariya-city (JP)

(72) Inventor: Masahiro Yamamoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 439 days.

(21) Appl. No.: 17/479,449

(22) Filed: Sep. 20, 2021

(65) Prior Publication Data

US 2022/0003844 A1     Jan. 6, 2022

Related U.S. Application Data

(63) Continuation of application No. PCT/JP2020/012449, filed on Mar. 19, 2020.

(30) Foreign Application Priority Data

Mar. 22, 2019    (JP) ................................. 2019-055031

(51) Int. Cl.
| | |
|---|---|
| *G01S 7/48* | (2006.01) |
| *G01S 7/481* | (2006.01) |
| *G01S 17/08* | (2006.01) |
| *G02B 27/00* | (2006.01) |

(52) U.S. Cl.
CPC .......... *G01S 7/4813* (2013.01); *G01S 7/4817* (2013.01); *G01S 17/08* (2013.01); *G02B 27/0006* (2013.01)

(58) Field of Classification Search
CPC ...... G01S 7/4813; G01S 7/4817; G01S 17/08; G01S 17/42; G01S 17/931; G02B 27/0006
See application file for complete search history.

(56) References Cited

U.S. PATENT DOCUMENTS

| | | | |
|---|---|---|---|
| 2006/0152705 A1 | 7/2006 | Yoshida et al. | |
| 2014/0320845 A1 | 10/2014 | Bayha et al. | |
| 2019/0293763 A1 | 9/2019 | Okumura et al. | |
| | (Continued) | | |

FOREIGN PATENT DOCUMENTS

| | | | | |
|---|---|---|---|---|
| DE | 102007035905 A1 | 2/2009 | | |
| EP | 1605729 A2 * | 12/2005 | ............. | B32B 17/10 |
| | (Continued) | | | |

OTHER PUBLICATIONS

Machine translation of WO 2020/158834 (Year: 2020).*

*Primary Examiner* — Hwa Andrew Lee
(74) *Attorney, Agent, or Firm* — Precision Patents, P.C.

(57) ABSTRACT

In a LIDAR device, a projector projects scanning light along a preset scanning direction, and a receiver receives incident light from a scan area. An optical window is provided in an opening of a housing that houses the projector and the receiver, where the optical window transmits the light projected by the projector and the light received by the receiver. A heater wire for heating the optical window is provided on a least a projection window that is a projector side area of the optical window. A wire spacing that is a minimum distance between two points on adjacent segments of the heater wire, one on each, is equal to or greater than a width of a beam of the light projected by the projector in a direction connecting the two points.

3 Claims, 5 Drawing Sheets

(56)        References Cited

U.S. PATENT DOCUMENTS

| 2020/0132850 | A1 * | 4/2020 | Crouch | ................. | G01S 7/4817 |
| 2021/0001695 | A1 * | 1/2021 | Ogawa | .................... | H05B 3/86 |
| 2022/0279627 | A1 * | 9/2022 | Kaji | .................. | G02B 27/0006 |

FOREIGN PATENT DOCUMENTS

| JP | 2006194639 | A | * | 7/2006 | ........... | G01S 17/936 |
| WO | WO-2020158834 | A1 | * | 8/2020 | .............. | H05B 3/20 |

* cited by examiner

LIDAR DEVICE WITH HEATER WIRE FOR HEATING OPTICAL WINDOW OF HOUSING

CROSS-REFERENCE TO RELATED APPLICATION

This international application claims the benefit of priority from Japanese Patent Application No. 2019-55031 filed with the Japan Patent Office on Mar. 22, 2019, the entire contents of which are incorporated herein by reference.

BACKGROUND

Technical Field

The present disclosure relates to a LIDAR device provided with an optical window.

Related Art

A LIDAR device is known for detecting a distance to an object by projecting and receiving light. LIDAR is an abbreviation for Light Detection and Ranging. This type of device includes a housing with an optical window for transmitting light provided at a site of the housing through which light emitted from internally to externally the housing and light incident from external to internal the housing pass.

DESCRIPTION OF SPECIFIC EMBODIMENTS

Figure 1:
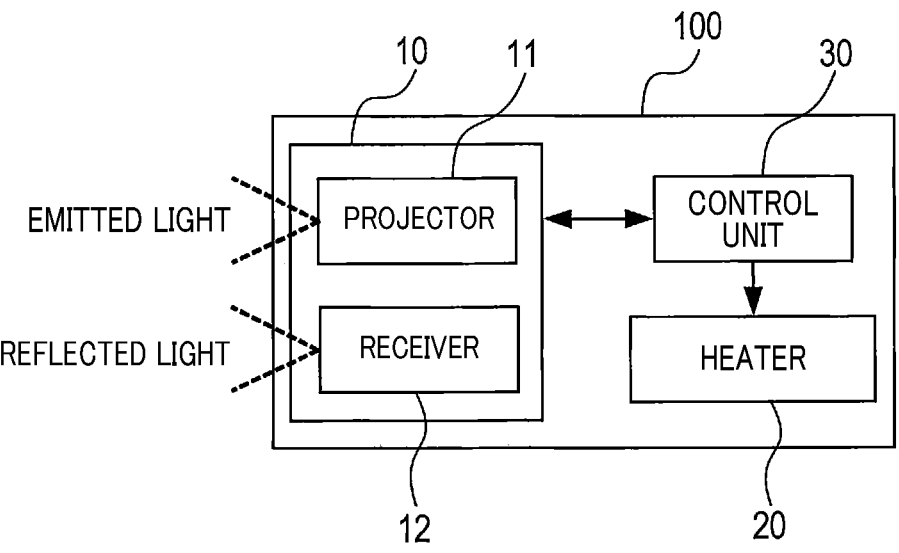
FIG. 1 is a block diagram of a LIDAR device.

The LIDAR device disclosed in Japanese Unexamined Patent Application Publication (Translation of PCT Application) JP-T-2015-506459 includes a heater for heating an optical window to remove raindrops, snow, dirt, and the like adhering to the optical window. The heater uses a heater wire wired so as to avoid an emission window that is an area of the optical window, through which the emitted light passes, thereby reducing the effect of the heater wire on the emitted light.

However, as a result of detailed research performed by the present inventors, the following issues were found with the technique described in JP-T-2015-506459.

That is, heating by the heater wire becomes less effective further away from the wiring area. Therefore, in the above-described technique in which the heater wire is wired around the emission window to avoid the inside of the emission window, an area closer to the center of the emission window is less heated. Thus, the optical window has failed to be heated efficiently.

In view of the foregoing, it is desired to have a technique for both efficiently heating an optical window and reducing the effect of a heater wire on projected light.

One aspect of the present embodiment provides a LIDAR device including: a projector configured to project scanning light along a preset scanning direction; a receiver configured to receive incident light from a scan area; an optical window provided in an opening of a housing that houses the projector and the receiver, the optical window transmitting the light projected by the projector and the light received by the receiver; and a heater wire configured to heat the optical window, the heater wire being provided on a least a projection window that is a projector side area of the optical window. In the LIDAR device, a wire spacing that is a minimum distance between two points on adjacent segments of the heater wire, one on each, is equal to or greater than a width of a beam of the light projected by the projector in a direction connecting the two points.

With this configuration, both efficient heating of the optical window and reduction of the effect of the heater wires on the projected light can be achieved.

Another aspect of the present embodiment provides a LIDAR device including: a projector configured to project scanning light along a preset scanning direction; a receiver configured to receive incident light from a scan area; an optical window provided in an opening of a housing that houses the projector and the receiver, the optical window transmitting the light projected by the projector and the light received by the receiver; and a heater wire configured to heat the optical window, the heater wire being provided on a least a projection window that is a projector side area of the optical window. In the LIDAR device, an area, blocked by the heater wire, of a cross-sectional area of the beam of light projected by the projector is 10% or less of the cross-sectional area of the beam.

With this configuration, both efficient heating of the optical window and reduction of the effect of the heater wires on the projected light can be achieved.

Hereinafter, some embodiments of the disclosure will be described with reference to the drawings.

1. OVERALL CONFIGURATION

The LIDAR device 100 illustrated in FIG. 1 is a ranging device that measures a distance to an object by emitting light and receiving its reflected light. The LIDAR device 100 is mounted to a vehicle and used for detecting various objects present ahead of the vehicle.

The LIDAR device 100 includes a measurement unit 10, a heater 20, and a control unit 30.

The measurement unit 10 includes a projector 11 that emits light intermittently and a receiver 12 that receives reflected light of the emitted light. The projector 11 emits a laser beam as light. The receiver 12 receives the reflected light from an object and converts the reflected light into an electrical signal.

Figure 2:
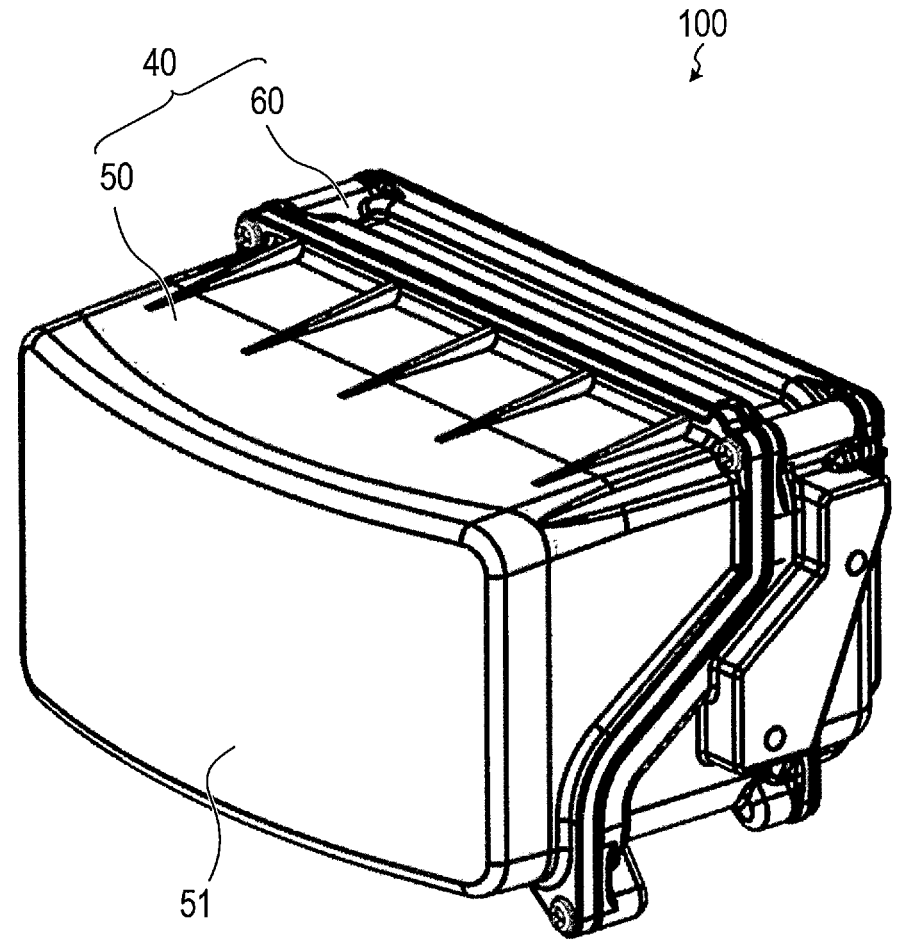
FIG. 2 is a perspective view of the LIDAR device.

The measurement unit 10 is stored within a housing 40 that includes a lid 50 and a housing body 60 as illustrated in FIG. 2. The optical window 51 side space inside the housing 40 is divided into upper and lower spaces. The projector 11 is stored in the upper space and the receiver 12 is stored in the lower space.

Figure 3:
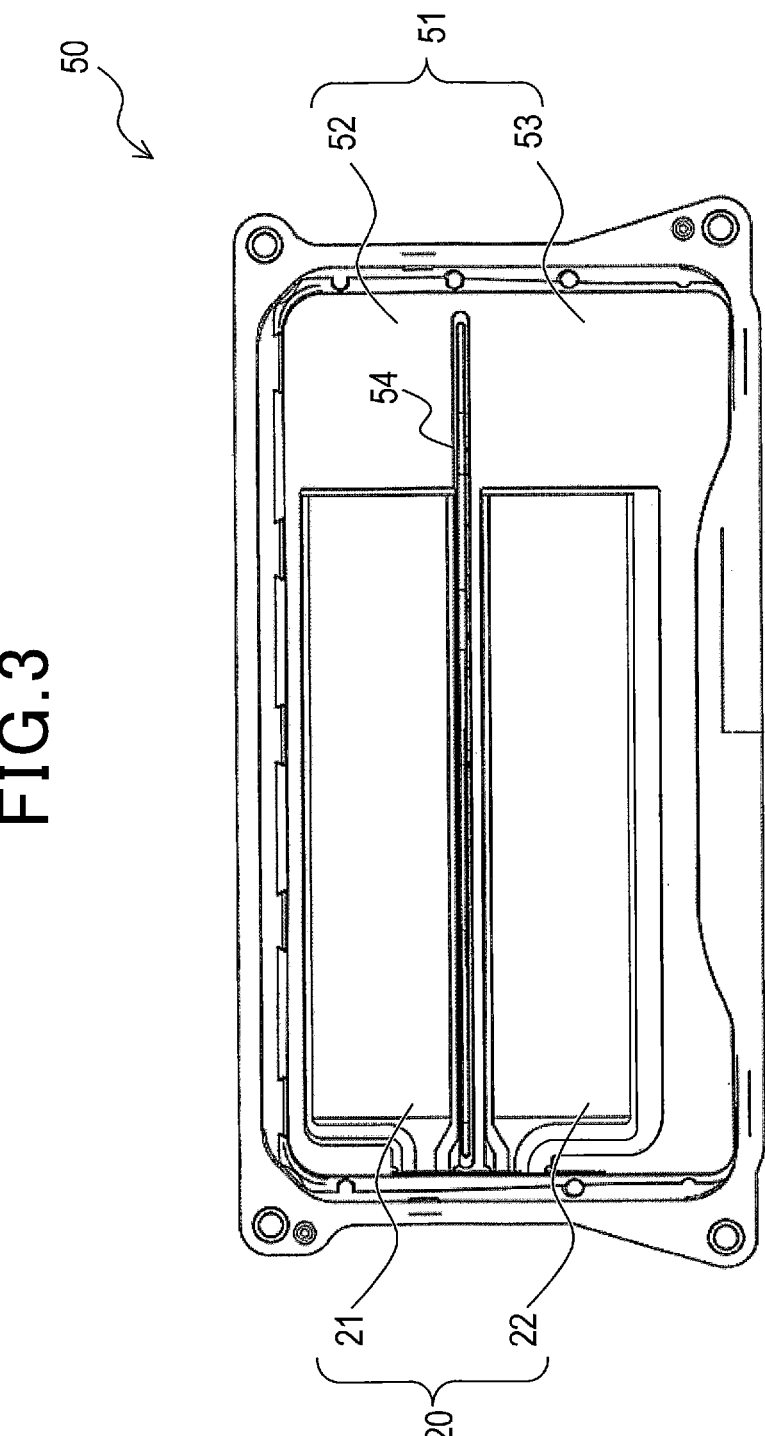
FIG. 3 is a lid of the LIDAR device as viewed from the inside.

A transparent optical window 51 through which light is transmitted is provided on the front surface of the lid 50. The front surface here refers to a surface toward which light is emitted in the LIDAR device 100. As illustrated in FIG. 3, a shield plate 54 is provided on the inner surface of the optical window 51 to separate the projector 11 side area from the receiver 12 side area in order to suppress leakage of light between the projector 11 and the receiver 12. Hereinafter, the area of the optical window 51 on the projector 11 side of the shield plate 54 is referred to as a projection window 52, and the area of the optical window 51 on the receiver 12 side of the shield plate 54 is referred to as a receipt window 53.

The heater 20 is provided on the inner surface of the optical window 51, is energized to operate, and is used for heating the optical window 51. The heater 20 includes a projection-window heater 21 and a receipt-window heater 22.

The control unit 30 illustrated in FIG. 1 uses the measurement unit 10 to measure a distance to an object irradiated with light. More specifically, the control unit 30 identifies the timing at which the reflected light was received based on a waveform of an electrical signal output from the receiver 12, and acquires the distance to the object based on a time difference between the timing at which the light was emitted and the timing at which the reflected light was received. In addition to the distance, the control unit 30 may also acquire information about the object, such as an azimuth of the object.

In addition to measuring the distance, the control unit 30 also controls energization of the heater 20. The heater 20 suitably heating the optical window 51 can inhibit adherence of snow or frost.

2. PROJECTOR

The projector 11 includes a light source that outputs light and a deflecting mirror that rotates according to driving of a motor. The projector 11 reflects light output from the light source with the deflecting mirror and emits the light in a direction corresponding to a rotation angle of the deflecting mirror, thereby scanning a preset scan area with light.

Figure 5:
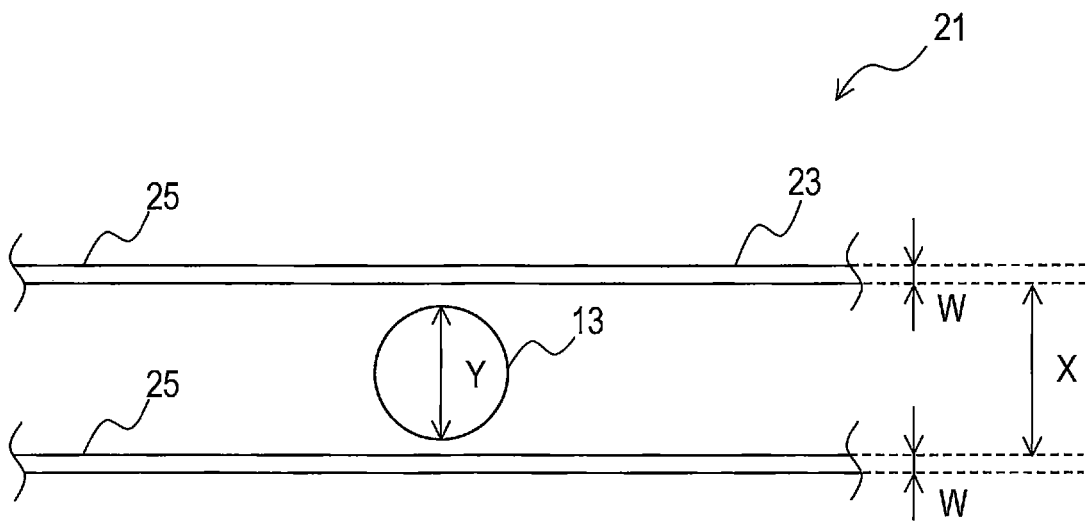
FIG. 5 is a schematic diagram of a portion of a projection window heater illustrating a relationship between the wire spacing between heater wire segments and the beam width of emitted light.

As illustrated in FIG. 5, the cross-sectional shape of the beam 13 emitted by the projector 11 is, in the present embodiment, a circular shape.

3. HEATER

Figure 4:
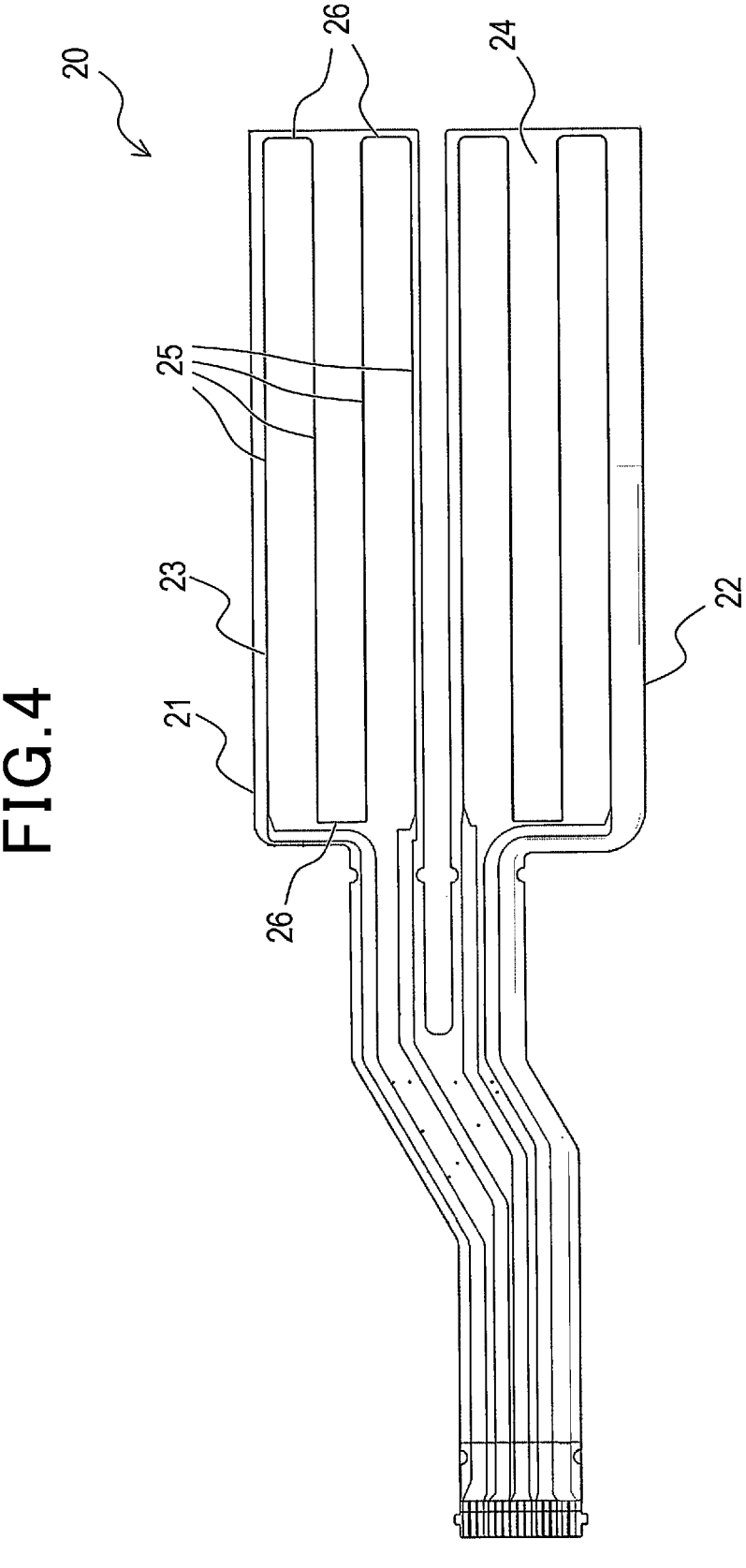
FIG. 4 is a wiring diagram of heater wires.

As illustrated in FIG. 4, the heater 20 is a film heater such that serpentine pattern-shaped heater wires 23 are wired on a base film 24. The heater wires 23 are formed as a heater circuit by etching after bonding a copper foil to the transparent base film 24. The heater 20 is attached to the inner surface of the optical window 51 with an optical adhesive tape. The projection-window heater 21 covers at least an area of the projection window 52, through which the emitted light passes, and the receipt window heater 22 covers at least an area of the receipt window 53, through which the reflected light passes.

Figure 6:
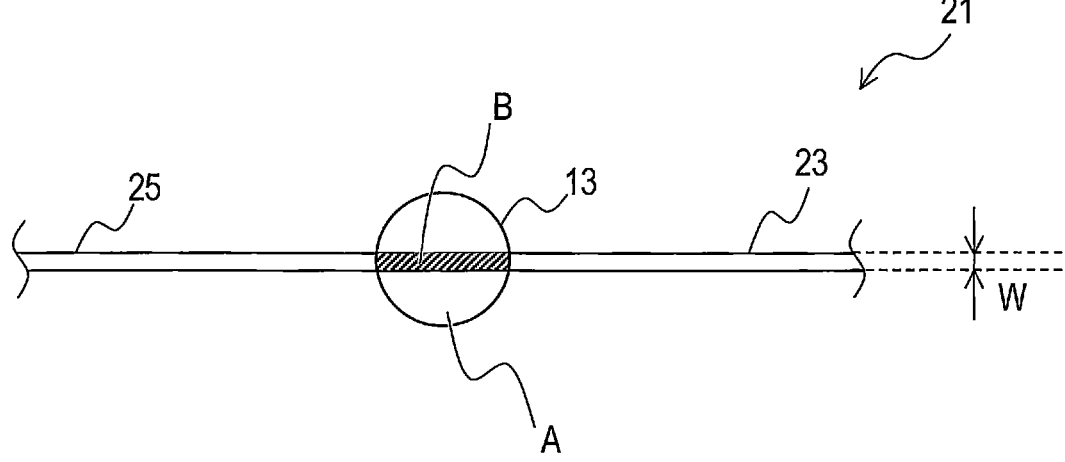
FIG. 6 is a schematic diagram of a portion of the projection window heater illustrating a relationship between the wire width of the heater wire and the cross-sectional area of a beam of emitted light.

The serpentine pattern-shaped heater wire 23 has long segments 25 and short segments 26. Ends of a plurality of respective long segments 25 are connected by the short segments 26. The projector 11 horizontally scans with light, and the long segments 25 are wired so as to be parallel to the scanning direction. As illustrated in FIGS. 5 and 6, which are enlarged views of a portion of the projection window heater 21 illustrated in FIG. 4, the line width W of each long segment 25 is constant.

FIG. 5 illustrates a case where the beam 13 emitted by the projector 11 passes through between adjacent long segments 25. The wire spacing X of the long segments 25 is a distance between adjacent long segments 25 and corresponds to a distance acquired by subtracting the line width W from a pitch that is a distance between the center lines of the long segments 25. The width Y of the beam 13 is a length of the beam 13 in a direction connecting two points on the long segments 25 where the wire spacing X is a minimum. In the present embodiment, since the long segments 25 are arranged in parallel, the wire spacing X is always constant. In addition, in the present embodiment, since the cross-sectional shape of the beam 13 is a circular shape, the width Y of the beam 13 is a diameter.

The wire spacing X of the long segments 25 is designed to be equal to or greater than the width Y of the beam 13. Therefore, two or more segments of the heater wire 23 do not overlap the beam 13 emitted by the projector 11. Since the short segments 26 are disposed outside an area of the projection window 52 through which the emitted light passes, the beam 13 overlaps none of the short segments 26.

FIG. 6 illustrates a case where the beam 13 emitted by the projector 11 overlaps one of the long segments 25. The line width W of the long segment 25 is designed such that a shaded area B, which is an area of the cross-sectional area A of the beam 13 blocked by the long segment 25, is 10% or less of the cross-sectional area A of the beam 13. In the present embodiment, since the area B is maximized when the long segment 25 passes through the center of the beam 13, the line width W is designed such that the area B in the case where the long segment 25 passes through the center of the beam 13 is 10% or less of the cross-sectional area A of the beam 13.

4. ADVANTAGES

The present embodiment described in detail above can provide the following advantages.

(4a) In the LIDAR device 100, the heater wire 23 is wired on the projection window 52, such that the heater wire 23 can more heat up to the center of the projection window 52. In addition, the wire spacing X of the long segments 25 is designed to be equal to or greater than the width Y of the beam 13 emitted by the projector 11, such that no more than one segment of the heater wire 23 overlaps the beam 13. If a plurality of segments of the heater wire 23 overlap the beam 13, the beam 13 tends to bend due to the effect of the heater wire 23. In the present embodiment, bending of the beam 13 due to the effect of the heater wire 23 can be suppressed. Therefore, both efficient heating of the optical window 51 and reduction of the effect of the heater wire 23 on the projected light can be achieved.

(4b) In the LIDAR device 100, the area B blocked by the heater wire 23, of the cross-sectional area A of the beam 13 emitted by the projector 11, is designed to be 10% or less of the cross-sectional area A of the beam 13. With this configuration, even when the beam 13 overlaps the heater wire 23, the ratio of the area blocked by the heater wire 23 to the cross-sectional area A of the beam 13 is kept small relative to the entire cross-sectional area of the beam 13, and the effect of the heater wire 23 on the projected light can be reduced.

(4c) In the LIDAR device 100, the heater wire 23 is also provided on the receipt window 53. With this configuration, the projection window 52 and the receipt window 53 can be efficiently heated, and deposits, such as raindrops, snow, and the like, can be entirely removed from the optical window 51, which can further improve the ranging accuracy.

(4d) The effect of the heater wire 23 on the light passing through the optical window 51 is greater in the projection window 52 than in the receipt window 53. This is because the cross-section of the beam 13 when passing through the projection window 52 is smaller and clearer as compared to when the beam 13 is reflected by an object and then passes through the receipt window 53, and thus is sensitive to the heater wire 23. In the present embodiment, the ranging accuracy can be improved by designing the heater wire 23 so as to reduce the effect of the heater wire 23 in the projection window 52.

6. OTHER EMBODIMENTS

The specific embodiment of the present disclosure has been described above, but the present disclosure may be implemented in various embodiments without being limited to the above embodiment.

(5*a*) In the above embodiment, the heater 20 is provided on the inner surface of the optical window 51. In an alternative embodiment, the heater 20 may be provided on the outer surface of the optical window 51.

(5*b*) In the above embodiment, the cross-sectional shape of the beam 13 emitted by the projector 11 is a circular shape. In an alternative embodiment, the cross-sectional shape of the beam 13 may be a square, an ellipse, or the like.

(5*c*) In the above embodiment, the long segments 25 are arranged in parallel such that the wire spacing X of the long segments 25 is always constant. In an alternative embodiment, the minimum wire spacing X of the long segments 25 is determined, and the minimum wire spacing X is designed to be equal to or greater than the width Y of the beam 13.

(5*d*) In the above embodiment, the wire spacing X of the long segments 25 is designed to be equal to or greater than the width Y of the beam 13. In an alternative embodiment, the width Y of the beam 13 may be set to be equal to or less than the wire spacing X of the long segments 25.

(5*e*) In the above embodiment, the line width W of the long segments 25 is designed such that the shaded area B, which is the area blocked by the long segment 25, is 10% or less of the cross-sectional area A of the beam 13. In an alternative embodiment, the cross-sectional area A of the beam 13 may be set to satisfy a condition that 10% or less of the cross-sectional area A of the beam 13 is the shaded area B that is the area blocked by the long segment 25.

(5*f*) For example, when the cross-sectional shape of the beam 13 is a square of about 2.5 to 5 mm on each side, the line width W of the long segments 25 should be 0.2 mm or less. In this case, the cross-sectional shape of the beam 13 is not limited to a square, but may be any other shape of equivalent size.

(5*g*) The functions of a single component may be distributed to a plurality of components, or the functions of a plurality of components may be consolidated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments.

(5*h*) Besides the LIDAR device 100 described above, the present disclosure can be implemented in various modes such as a system including the LIDAR device 100 as a constituent element.

What is claimed is:

1. A LIDAR device comprising:

a projector configured to project scanning light along a preset horizontal scanning direction;

a receiver configured to receive incident light from a scan area;

a housing configured to house the projector and the receiver, with an optical window provided in an opening of the housing, the optical window transmitting the light projected by the projector and the light received by the receiver; and a heater wire configured to heat the optical window, the heater wire being provided on a least a projection window that is a projector side area of the optical window, wherein the heater wire comprises a plurality of long segments and a plurality of short segments and is serpentine pattern-shaped, wherein the plurality of long segments and the plurality of short segments are alternately arranged and form a single current path, and wherein each end of a short segment of the plurality of short segments is connected to an end of an adjacent long segment of the plurality of long segments, the plurality of long segments are disposed in parallel with the horizontal scanning direction and are at least disposed inside an area of the projection window through which the light projected by the projector passes, the plurality of short segments are disposed outside an area of the projection window through which the light projected by the projector passes, a wire spacing that is a minimum distance between a first point on a first long segment and a second point on a second long segment is equal to or greater than a width of a beam of the light projected by the projector in a direction connecting the first point and the second point, the first long segment being adjacent to the second long segment, and the scanning light is unobstructed by the first long segment and the second long segment as the light is projected between the first long segment and the second long segment along the preset horizontal scanning direction.

2. The LIDAR device according to claim 1, wherein an area, blocked by the heater wire, of a cross-sectional area of the beam of light emitted by the projector is 10% or less of the cross-sectional area of the beam.

3. The LIDAR device according to claim 1, wherein further comprising a heater wire provided on a receipt window that is a receiver side area of the optical window.

* * * * *